US012451124B2

(12) United States Patent
Nagano et al.

(10) Patent No.: US 12,451,124 B2
(45) Date of Patent: Oct. 21, 2025

(54) DOMAIN ADAPTIVE SPEECH RECOGNITION USING ARTIFICIAL INTELLIGENCE

(71) Applicant: International Business Machines Corporation, Armonk, NY (US)

(72) Inventors: Tohru Nagano, Tokyo (JP); Gakuto Kurata, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 338 days.

(21) Appl. No.: 17/965,226

(22) Filed: Oct. 13, 2022

(65) Prior Publication Data
US 2024/0127801 A1    Apr. 18, 2024

(51) Int. Cl.
*G10L 15/16*    (2006.01)
*G10L 15/02*    (2006.01)
(Continued)

(52) U.S. Cl.
CPC .............. *G10L 15/16* (2013.01); *G10L 15/02* (2013.01); *G10L 15/063* (2013.01); *G10L 15/30* (2013.01); *G10L 2015/022* (2013.01)

(58) Field of Classification Search
None
See application file for complete search history.

(56) References Cited

U.S. PATENT DOCUMENTS

| | | |
|---|---|---|
| 6,910,012 B2 | 6/2005 | Hartley et al. |
| 8,751,230 B2 * | 6/2014 | Saffer .................. G10L 15/06 704/235 |

(Continued)

FOREIGN PATENT DOCUMENTS

| | | |
|---|---|---|
| CN | 108364651 A | 8/2018 |
| CN | 112309393 A | 2/2021 |

(Continued)

OTHER PUBLICATIONS

Kanishka Rao, Has,im Sak, Rohit Prabhavalkar, "Exploring Architectures, Data and Units for Streaming End-To-End Speech Recognition With RNN-Transducer", 2017 IEEE Automatic Speech Recognition and Understanding Workshop (ASRU),IEEE, pp. 193-199. (Year: 2017).*

(Continued)

*Primary Examiner* — Paras D Shah
*Assistant Examiner* — Nadira Sultana
(74) *Attorney, Agent, or Firm* — Ryan, Mason & Lewis, LLP (57) ABSTRACT

Methods, systems, and computer program products for domain adaptive speech recognition using artificial intelligence are provided herein. A computer-implemented method includes generating a set of language data candidates, each language data candidate comprising one or more graphemes, by processing a sequence of phonemes related to input speech data using an artificial intelligence-based data conversion model; determining, for a target pair of phonemes and graphemes, a subset of graphemes from the set of language data candidates; generating a first speech recognition output by processing the subset of graphemes using at least one biasing language model and an artificial intelligence-based speech recognition model; generating a second speech recognition output by replacing at least a portion of the subset of graphemes in the first speech recognition output with at least one of the graphemes from the target pair; and performing automated actions based on the second speech recognition output.

20 Claims, 4 Drawing Sheets

(51) Int. Cl.
*G10L 15/06* (2013.01)
*G10L 15/30* (2013.01)

(56) References Cited

U.S. PATENT DOCUMENTS

| | | | |
|---|---|---|---|
| 10,535,339 B2* | 1/2020 | Fujimura | G10L 15/183 |
| 11,195,513 B2 | 12/2021 | Kurata et al. | |
| 11,238,845 B2* | 2/2022 | Chen | G10L 15/005 |
| 12,014,725 B2* | 6/2024 | Huang | G10L 15/063 |
| 2009/0150153 A1 | 6/2009 | Li et al. | |
| 2018/0211652 A1* | 7/2018 | Mun | G10L 15/187 |
| 2018/0286386 A1 | 10/2018 | Baughman et al. | |
| 2019/0096390 A1* | 3/2019 | Kurata | G10L 15/063 |
| 2019/0122654 A1* | 4/2019 | Song | G10L 15/187 |
| 2020/0027445 A1 | 1/2020 | Raghunathan et al. | |
| 2021/0295846 A1* | 9/2021 | Yang | G10L 25/30 |
| 2021/0312294 A1* | 10/2021 | Kurata | G06F 18/24 |
| 2022/0172706 A1* | 6/2022 | Hu | G10L 15/083 |
| 2022/0310071 A1* | 9/2022 | Botros | G10L 15/083 |
| 2022/0310077 A1* | 9/2022 | Tu | G10L 15/22 |
| 2022/0319506 A1* | 10/2022 | Heikinheimo | G10L 15/065 |

FOREIGN PATENT DOCUMENTS

| | | |
|---|---|---|
| CN | 113692616 A | 11/2021 |
| CN | 115132175 A | 9/2022 |
| CN | 120019431 A | 5/2025 |
| DE | 112023003661 T5 | 6/2025 |
| WO | 2024/078565 A1 | 4/2024 |

OTHER PUBLICATIONS

Rao et al., Exploring Architectures, Data and Units for Streaming End-To-End Speech Recognition with RNN-Transducer, IEEE Automatic Speech Recognition and Understanding Workshop (ASRU), Dec. 2017.

Masumura et al., Phoneme-to-Grapheme Conversion Based Large-Scale Pre-Training for End-to-End Automatic Speech Recognition, INTERSPEECH 2020, Oct. 2020.

Samarakoon et al., Domain Adaptation of End-to-end Speech Recognition in Low-Resource Settings, IEEE Spoken Language Technology Workshop (SLT), Dec. 2018.

Decadt et al., Phoneme-to-Grapheme Conversion for Out-of-Vocabulary Words in Speech Recognition, IEEE Automatic Speech Recognition and Understanding Workshop, Oct. 2001.

\* cited by examiner

DOMAIN ADAPTIVE SPEECH RECOGNITION USING ARTIFICIAL INTELLIGENCE

BACKGROUND

The present application generally relates to information technology and, more particularly, to language data processing. More specifically, speech recognition poses numerous challenges. For example, conventional speech recognition approaches are commonly resource-intensive and error-prone.

SUMMARY

In at least one embodiment, techniques for domain adaptive speech recognition using artificial intelligence are provided. An example computer-implemented method includes generating a set of language data candidates, each language data candidate comprising one or more graphemes, by processing a sequence of phonemes related to input speech data using an artificial intelligence-based data conversion model, and determining, for a target pair of one or more phonemes and one or more graphemes, a subset of graphemes from the set of language data candidates. The method also includes generating a first speech recognition output by processing at least a portion of the subset of graphemes using at least one biasing language model and an artificial intelligence-based speech recognition model. Additionally, the method includes generating a second speech recognition output by replacing at least a portion of the subset of graphemes in the first speech recognition output with at least one of the one or more graphemes from the target pair, and performing one or more automated actions based at least in part on the second speech recognition output.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, at least one embodiment includes domain adaptive speech recognition using artificial intelligence. Such an embodiment includes training a first generator which receives a sequence of phonemes and outputs a plurality of word candidates, each candidate including one or more graphemes. By way of illustration, in one or more embodiments, the first generator can use and/or encompass at least a portion of a trained end-to-end automatic speech recognition (ASR) model.

In one or more embodiments, the generator includes at least one neural network model. As further detailed below, in the example embodiment depicted in FIG. 1, artificial intelligence-based data conversion model 104 (also referred to herein as enhanced_sounds_like generator) includes a neural network model, and the prediction part of the generator reuses a prediction part of a recurrent neural network transducer (RNN-T) model (e.g., RNN-T decoder 110). That said, in one or more additional embodiments, reusing that part of the RNN-T model is not mandatory and the generator can include a non-neural network model such as, for example, a rule-based generator which can convert phonemes to graphemes.

Additionally, for a target pair of a sequence of phonemes and a word of one or more graphemes, at least one embodiment includes determining the N-best words of one or more graphemes using the trained first generator. The N-best words can be output, for example, in order of probability. In such an embodiment, the generator reads a sounds_like element of a speech input, and output the N-best enhanced_sounds_like words. Also, one or more embodiments include training at least one biasing language model (LM) with the determined N-best words of one or more graphemes. In such an embodiment, an RNN-T model (e.g., a prediction network and a speech encoder, such as depicted via element 110 in FIG. 1) has an inseparable LM, which can be trained with a pair of speech data and text data. Additionally, a biasing LM can be trained with only text data.

Further, in such an embodiment, the trained biasing LM can be used with the trained end-to-end ASR model to generate one or more output transcripts, and replacing at least one of the N-best words of one or more graphemes appearing in the one or more transcripts with the word of one or more graphemes from the target pair. By way of illustration, in the case of the English language, a user can set display_as: "IEEE" and sounds_like: "AY T R IH P AX L IY," and the generator converts sounds_like to enhanced_sounds_like: ["I triple E," "eye triple iye"]. Additionally, in such an embodiment, the language model is trained with these enhanced_sounds_like entries, and the output transcript includes enhanced_sounds_like such as "I joined I triple E." Also, as an end-user likely expects the "IEEE," word replacement can be performed to invert "I triple E" to "IEEE." Accordingly, in such an example, the end-user receives "I joined IEEE."

Figure 2:
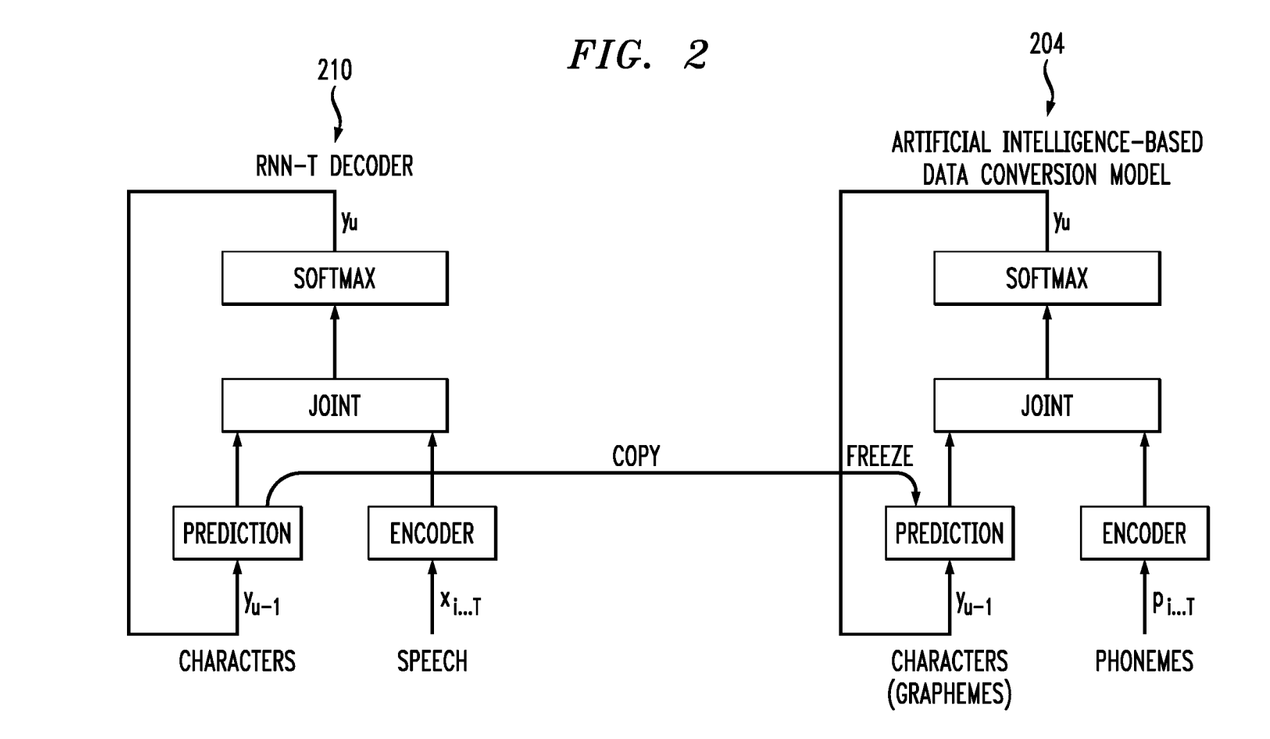
FIG. 2 is a diagram illustrating a neural network training procedure, according to an example embodiment of the invention.

As further detailed herein, in one or more embodiments, the trained end-to-end ASR model can include a trained RNN-T, and the first generator uses a prediction network of the trained RNN-T as its own prediction network. As noted above, in such an embodiment, a separate language model and an acoustic model cannot be separated, but the prediction network is similar to the language model, because, as shown in FIG. 2, for example, the prediction network of 210 reads a previous character ($y_{u-1}$) and outputs a next character ($y_u$). Accordingly, in such an embodiment, a prediction network can perform as a language model.

Additionally, at least one embodiment includes obtaining at least one sequence of phonemes as input for a generator from a processing of a word of graphemes.

Figure 1:
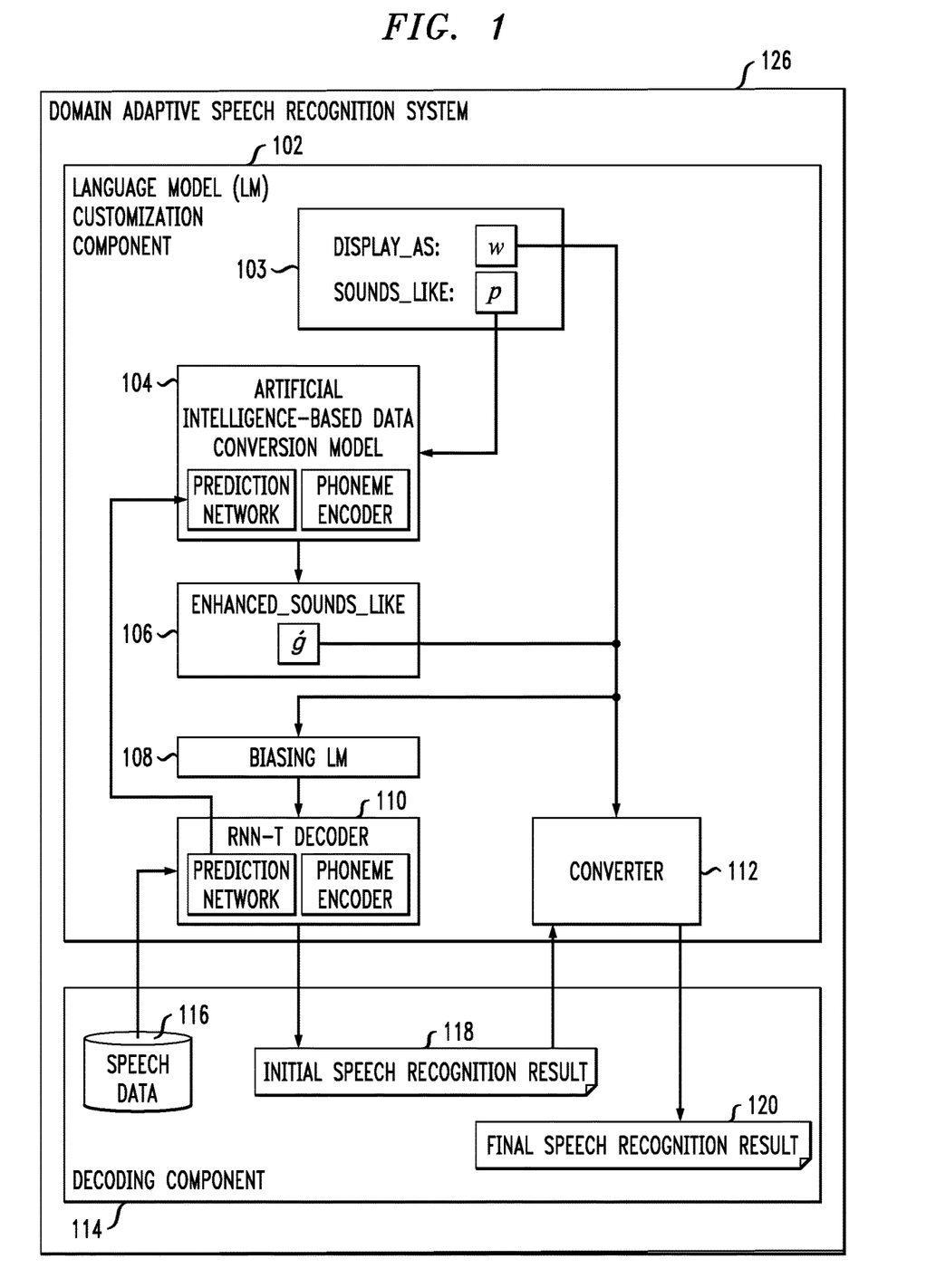
FIG. 1 is a diagram illustrating an illustrative speech recognition workflow, according to an example embodiment of the invention.

FIG. 1 is a diagram illustrating an illustrative speech recognition workflow in connection with domain adaptive speech recognition system 126, according to an example embodiment of the invention. Specifically, FIG. 1 depicts an example embodiment, using LM customization component 102 and decoding component 114, for recognizing an unknown word "IEEE" in English. An example embodiment such as depicted in FIG. 1 includes generating a list of words (each including one or more graphemes) from given a sequence of phonemes using a translator component referred to herein as artificial intelligence-based data conversion model 104 (or enhanced_sounds_like generator). As depicted in FIG. 1, artificial intelligence-based data conversion model 104 includes a phoneme encoder and a common prediction network to RNN-T decoder 110, wherein the prediction network allows artificial intelligence-based data conversion model 104 to produce graphemes 106 that imitate the behavior of RNN-T decoder 110.

Additionally, as depicted by FIG. 1, speech data 116, from decoding component 114, is decoded by RNN-T decoder 110, in conjunction with biasing LM 108, into a list of words representing an initial speech recognition result 118. Also, one or more words in the initial speech recognition result 118 are replaced with at least a portion of the original input speech data 103 processed by converter 112, resulting in final speech recognition result 120. In one or more embodiments, converter 112 converts enhanced_sounds_like output (e.g., graphemes 106) to display_as in original input speech data 103.

One or more embodiments includes training artificial intelligence-based data conversion model 104 using phoneme and grapheme pairs. In at least one embodiment, artificial intelligence-based data conversion model 104 can include an encoder-decoder network. As also depicted in FIG. 1 in connection with LM customization component 102, a user adds original input speech data 103 which include one or more pairs of display_as data (w) and sounds_like data (p). The trained model (i.e., artificial intelligence-based data conversion model 104) generates up to N-best graphemes 106 ($\acute{g}=\{\acute{g}_1, \ldots \acute{g}_N\}$) from the a larger set of graphemes based at least in part on character sequence generation probability from the input phonemes (p). By way of example, in the case of an English input of "AY T R IH P AX L IY," an output of artificial intelligence-based data conversion model 104 may be "I triple E" with a probability of 0.03, and/or "eye triple iye" with a probability of 0.02. Further, biasing LM 108 can then be trained using graphemes ($\acute{g}$) 106.

As additionally depicted in FIG. 1, decoding input speech data can include using RNN-T decoder 110, with biasing LM 108, to read and process original input speech data 103 and output initial speech recognition result 118 (e.g., one or more transcripts). One or more embodiments also include replace $\acute{g}_{1 \ldots N}$ in the initial speech recognition result 118 with the corresponding string for display_as data (w) from original input speech data 103, thereby generating final speech recognition result 120.

FIG. 2 is a diagram illustrating a neural network training procedure, according to an example embodiment of the invention. Specifically, FIG. 2 depicts training RNN-T decoder 210 with one or more speech-characters pairs (e.g., one or more $y_{u-1}$ and $x_{i \ldots T}$ pairs), and training artificial intelligence-based data conversion model 204 as detailed below. For example, in at least one embodiment, training artificial intelligence-based data conversion model 204 includes initializing the prediction network of the artificial intelligence-based data conversion model 204 with the trained prediction network of RNN-T decoder 210, freezing prediction network of the artificial intelligence-based data conversion model 204 during training of the of the artificial intelligence-based data conversion model 204, and training the artificial intelligence-based data conversion model 204 with one or more character (graphemes)-phonemes pairs (e.g., one or more $y_{u-1}$ and $p_{i \ldots T}$ pairs). The training of the neural network is an iterative training, wherein each iteration includes a forward process and a backward process (also referred to as back propagation). The freezing step disables the backward process in such training. To this end, the weight of the frozen part of the neural network is not changed during the training. Additionally, in an example embodiment such as depicted in FIG. 2 (and FIG. 1), RNN-T decoder 210 and artificial intelligence-based data conversion model 204 use a common and/or shared prediction network.

In one or more embodiments, the speech recognition model detailed herein is not limited to an RNN-T but can include, for example, one or more types of end-to-end ASR models. Additionally, in connection with a biasing LM such as detailed herein, input is not limited to one or more individual words, but can also include one or more sentences and/or one or more compound words.

By way merely of illustration, consider an English language use case example, wherein an end-user provides original input speech data 103 display_as: "IEEE" and sounds_like: "AY T R IH P AX L IY." Also, artificial intelligence-based data conversion model 104 converts sounds_like: "AY T R IH P AX L IY" to enhanced_sounds_like: ["I triple E", "eye triple iye"] (i.e., graphemes 106), and biasing LM 108 is implemented with enhanced_sounds_like graphemes 106. Additionally, the converter 112 is prepared from enhanced_sounds_like: ["I triple E", "eye triple iye"] to display_as: "IEEE." At the runtime (decoding) process, the RNN-T decoder 110 can output "I joined I triple E," and word replacement is performed with converter 112 to convert "I triple E" to "IEEE." As such, the end-user receives "I joined IEEE." Accordingly, as seen via such an example, one or more embodiments include training the biasing LM 108 with easy-to-learn graphemes 106 rather training the biasing LM 108 with display_as and sounds_like original user inputs 103, then reverting the output to the original word (display_as).

Also, in at least one embodiment, an artificial intelligence-based data conversion model can include at least one RNN-T translator model with a prediction network of an RNN-T speech recognition network, but such a model type represents merely one example and other model types can be implemented. Further, while the example embodiment depicted in FIG. 1 includes the use of the English language, one or more embodiments are not limited to English but rather can include the use of various other languages (such as, e.g., Japanese). Additionally, in such embodiment, varying pronunciations for one or more words (within a given language) can be utilized in connection with the speech recognition model detailed herein.

Figure 3:
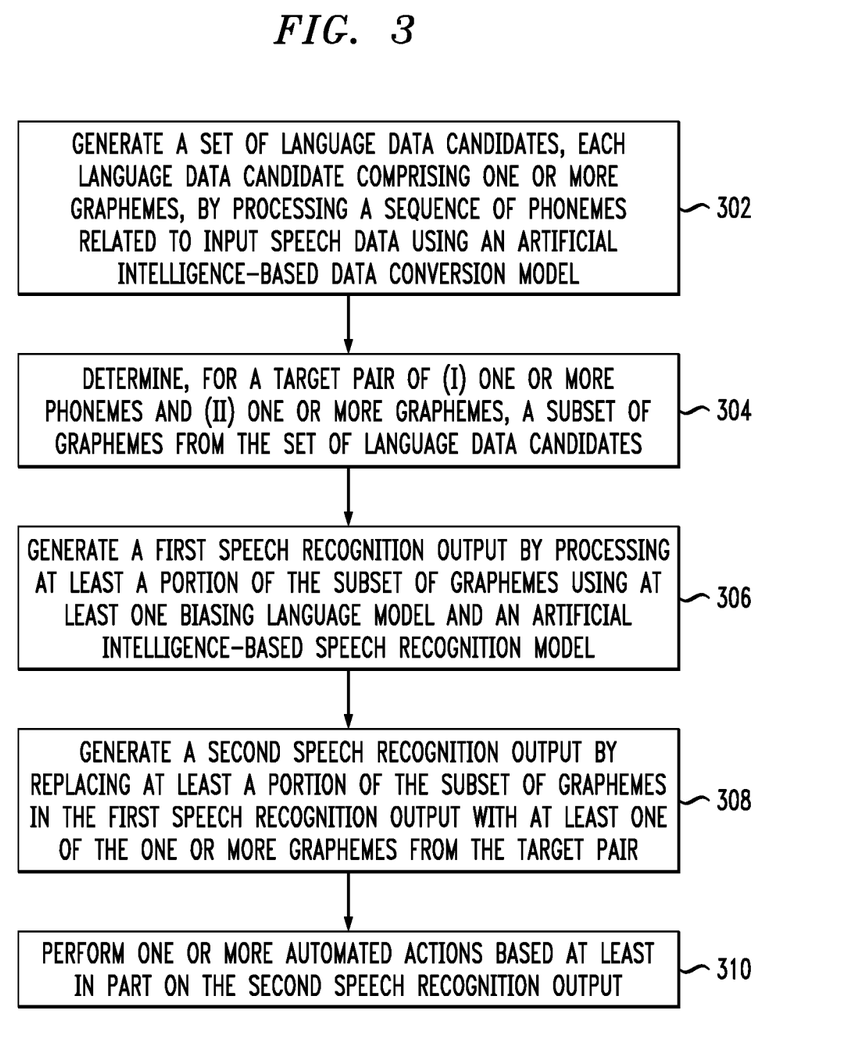
FIG. 3 is a flow diagram illustrating techniques according to an example embodiment of the invention.

FIG. 3 is a flow diagram illustrating techniques according to an embodiment of the present invention. Step 302 includes generating a set of language data candidates, each language data candidate comprising one or more graphemes, by processing a sequence of phonemes related to input speech data using an artificial intelligence-based data conversion model. In at least one embodiment, the artificial intelligence-based data conversion model includes at least one encoder-decoder neural network. Additionally, in one or more embodiments, the artificial intelligence-based data conversion model implements a prediction network common to the artificial intelligence-based speech recognition model.

One or more embodiments can also include training the artificial intelligence-based data conversion model using one or more graphemes-phonemes pairs. Further, in at least one embodiment, the input speech data can include one or more of one or more individual words, one or more sentences, and one or more compound words.

Step 304 includes determining, for a target pair of one or more phonemes and one or more graphemes, a subset of graphemes from the set of language data candidates.

Step 306 includes generating a first speech recognition output by processing at least a portion of the subset of graphemes using at least one biasing language model and an artificial intelligence-based speech recognition model. In at least one embodiment, the artificial intelligence-based speech recognition model includes a recurrent neural network transducer. Additionally or alternatively, the artificial intelligence-based speech recognition model can include at least one end-to-end automatic speech recognition model.

One or more embodiments can also include training the at least one biasing language model using at least a portion of the subset of graphemes.

Step 308 includes generating a second speech recognition output by replacing at least a portion of the subset of graphemes in the first speech recognition output with at least one of the one or more graphemes from the target pair.

Step 310 includes performing one or more automated actions based at least in part on the second speech recognition output. In at least one embodiment, performing one or more automated actions includes automatically training at least one of the artificial intelligence-based data conversion model and the artificial intelligence-based speech recognition model using feedback data related to the second speech recognition output. Additionally or alternatively, performing one or more automated actions can include outputting, to at least one user, the second speech recognition output in response to the input speech data.

Further, in one or more embodiments, software implementing the techniques depicted in FIG. 3 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
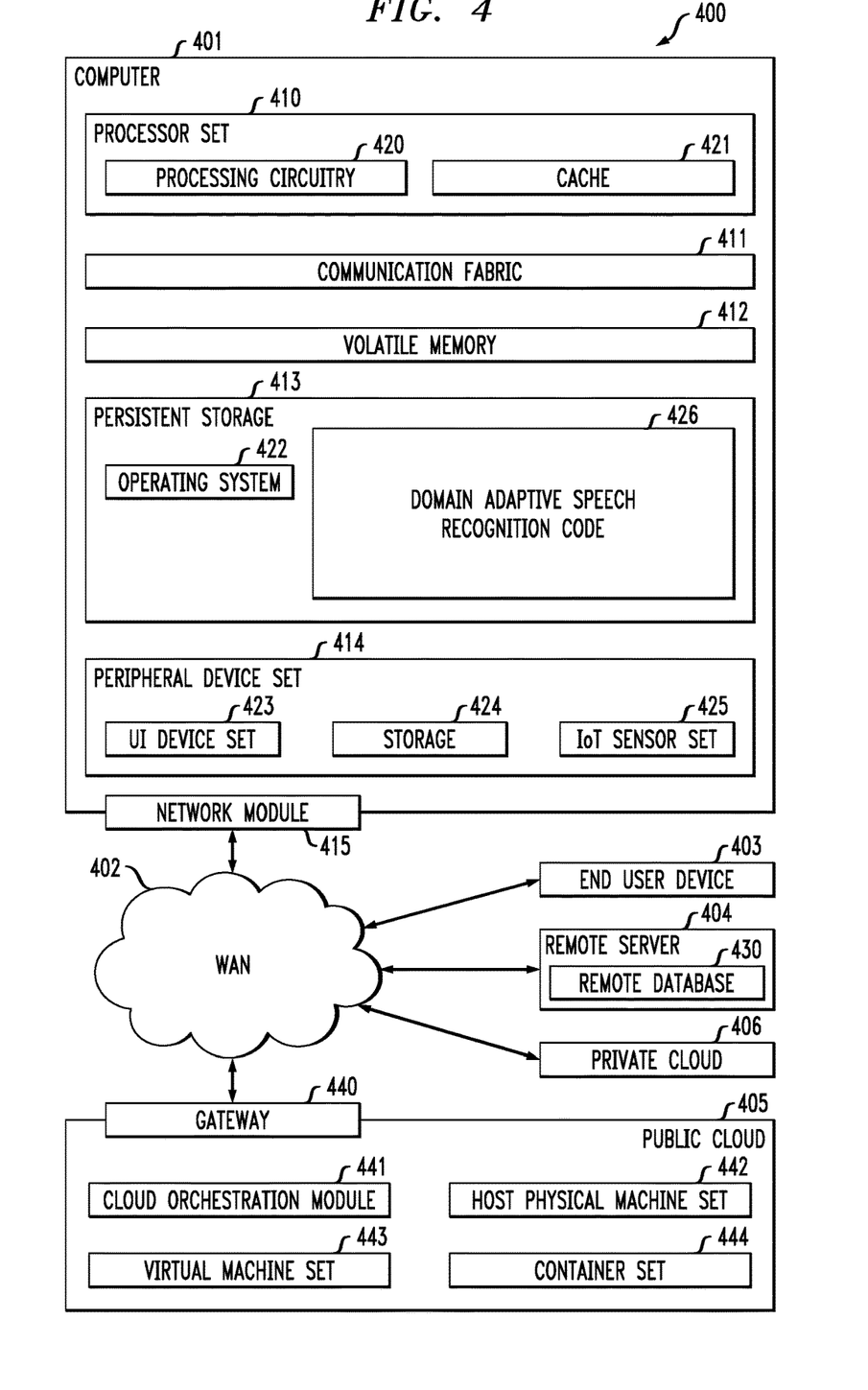
FIG. 4 is a diagram illustrating a computing environment in which at least one embodiment of the invention can be implemented.

Computing environment 400 contains an example of an environment for the execution of at least some of the computer code involved in performing the inventive methods, such as domain adaptive speech recognition code 426. In addition to code 426, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and code 426, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in code 426 in persistent storage 413.

Communication fabric 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type RAM or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a ROM, but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in code 426 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

In computing environment 400, computer 401 is shown as being connected to the internet (see WAN 402). However, in one or more embodiments of the present invention computer 401 will be isolated from communicating over communications network and not connected to the internet, running as a standalone computer. In these embodiments, network module 415 of computer 401 may not be necessary or even desirable in order to ensure isolation and to prevent external communications coming into computer 401. The standalone computer embodiments are potentially advantageous, at least in some applications of the present invention, because they are typically more secure. In other embodiments, computer 401 is connected to a secure WAN or a secure LAN instead of WAN 402 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    generating a set of language data candidates, each language data candidate comprising one or more graphemes, by processing a sequence of phonemes related to user-provided domain-specific input speech data using an artificial intelligence-based data conversion model comprising a neural network model sharing a prediction network from a recurrent neural network transducer;
    determining, for a target pair of one or more phonemes and one or more graphemes, a subset of graphemes from the set of language data candidates;
    training at least one biasing language model using at least a portion of the subset of graphemes;
    generating a first speech recognition output by processing the at least a portion of the subset of graphemes using the at least one biasing language model and an artificial intelligence-based speech recognition model comprising the recurrent neural network transducer, including the prediction network shared by the artificial intelligence-based data conversion model;
    generating a second speech recognition output by replacing at least a portion of the subset of graphemes in the first speech recognition output with at least one of the one or more graphemes from the target pair; and
    performing one or more automated actions based at least in part on the second speech recognition output;
    wherein the method is carried out by at least one computing device.

2. The computer-implemented method of claim 1, wherein the artificial intelligence-based data conversion model comprises at least one encoder-decoder neural network.

3. The computer-implemented method of claim 1, wherein the artificial intelligence-based speech recognition model comprises at least one end-to-end automatic speech recognition model.

4. The computer-implemented method of claim 1, further comprising:
    training the artificial intelligence-based data conversion model using one or more graphemes-phonemes pairs.

5. The computer-implemented method of claim 1, wherein performing one or more automated actions comprises automatically training at least one of the artificial intelligence-based data conversion model and the artificial intelligence-based speech recognition model using feedback data related to the second speech recognition output.

6. The computer-implemented method of claim 1, wherein performing one or more automated actions comprises outputting, to at least one user, the second speech recognition output in response to the user-provided domain-specific input speech data.

7. The computer-implemented method of claim 1, wherein the user-provided domain-specific input speech data comprise one or more of one or more individual words, one or more sentences, and one or more compound words.

8. The computer-implemented method of claim 1, wherein software implementing the method is provided as a service in a cloud environment.

9. A computer program product comprising a computer readable storage medium having program instructions embodied therewith, the program instructions executable by a computing device to cause the computing device to:
    generate a set of language data candidates, each language data candidate comprising one or more graphemes, by processing a sequence of phonemes related to user-provided domain-specific input speech data using an artificial intelligence-based data conversion model comprising a neural network model sharing a prediction network from a recurrent neural network transducer;
    determine, for a target pair of one or more phonemes and one or more graphemes, a subset of graphemes from the set of language data candidates;
    train at least one biasing language model using at least a portion of the subset of graphemes;
    generate a first speech recognition output by processing the at least a portion of the subset of graphemes using the at least one biasing language model and an artificial intelligence-based speech recognition model comprising the recurrent neural network transducer, including the prediction network shared by the artificial intelligence-based data conversion model;
    generate a second speech recognition output by replacing at least a portion of the subset of graphemes in the first speech recognition output with at least one of the one or more graphemes from the target pair; and
    perform one or more automated actions based at least in part on the second speech recognition output.

10. The computer program product of claim 9, wherein the artificial intelligence-based data conversion model comprises at least one encoder-decoder neural network.

11. The computer program product of claim 9, wherein the artificial intelligence-based speech recognition model comprises at least one end-to-end automatic speech recognition model.

12. The computer program product of claim 9, wherein performing one or more automated actions comprises outputting, to at least one user, the second speech recognition output in response to the user-provided domain-specific input speech data.

13. The computer program product of claim 9, wherein the program instructions executable by the computing device further cause the computing device to:
train the artificial intelligence-based data conversion model using one or more graphemes- phonemes pairs.

14. The computer program product of claim 9, wherein performing one or more automated actions comprises automatically training at least one of the artificial intelligence-based data conversion model and the artificial intelligence-based speech recognition model using feedback data related to the second speech recognition output.

15. A system comprising:
a memory configured to store program instructions; and
a processor operatively coupled to the memory to execute the program instructions to:
generate a set of language data candidates, each language data candidate comprising one or more graphemes, by processing a sequence of phonemes related to user-provided domain-specific input speech data using an artificial intelligence-based data conversion model comprising a neural network model sharing a prediction network from a recurrent neural network transducer;
determine, for a target pair of one or more phonemes and one or more graphemes, a subset of graphemes from the set of language data candidates;
train at least one biasing language model using at least a portion of the subset of graphemes;
generate a first speech recognition output by processing the at least a portion of the subset of graphemes using the at least one biasing language model and an artificial intelligence-based speech recognition model comprising the recurrent neural network transducer, including the prediction network shared by the artificial intelligence-based data conversion model;
generate a second speech recognition output by replacing at least a portion of the subset of graphemes in the first speech recognition output with at least one of the one or more graphemes from the target pair; and
perform one or more automated actions based at least in part on the second speech recognition output.

16. The system of claim 15, wherein the artificial intelligence-based data conversion model comprises at least one encoder-decoder neural network.

17. The system of claim 15, wherein performing one or more automated actions comprises outputting, to at least one user, the second speech recognition output in response to the user-provided domain-specific input speech data.

18. The system of claim 15, wherein the artificial intelligence-based speech recognition model comprises at least one end-to-end automatic speech recognition model.

19. The system of claim 15, wherein the processor is operatively coupled to the memory to further execute the program instructions to:
train the artificial intelligence-based data conversion model using one or more graphemes-phonemes pairs.

20. The system of claim 15, wherein performing one or more automated actions comprises automatically training at least one of the artificial intelligence-based data conversion model and the artificial intelligence-based speech recognition model using feedback data related to the second speech recognition output.

* * * * *